US012753110B2

(12) United States Patent
Loman et al.

(10) Patent No.: US 12,753,110 B2
(45) Date of Patent: Oct. 6, 2026

(54) ULTRAVIOLET CURABLE ENAMEL COMPOSITIONS

(71) Applicant: FENZI AGT NETHERLANDS B.V., Maastricht (NL)

(72) Inventors: Albert J.B. Loman, Maastricht (NL); Philippe Germain Robert Marquet, Maastricht (NL)

(73) Assignee: FENZI AGT NETHERLANDS B.V., Maastricht (NL)

( * ) Notice: Subject to any disclaimer, the term of this patent is extended or adjusted under 35 U.S.C. 154(b) by 355 days.

(21) Appl. No.: 18/702,718

(22) PCT Filed: Oct. 7, 2022

(86) PCT No.: PCT/NL2022/050568

§ 371 (c)(1),
(2) Date: Apr. 18, 2024

(87) PCT Pub. No.: WO2023/068923

PCT Pub. Date: Apr. 27, 2023

(65) Prior Publication Data

US 2024/0417313 A1 Dec. 19, 2024

(30) Foreign Application Priority Data

Oct. 18, 2021 (GB) ...................................... 2114865

(51) Int. Cl.

*C03C 8/16* (2006.01)
*B41M 7/00* (2006.01)
*C09D 11/101* (2014.01)
*C09D 11/102* (2014.01)

(52) U.S. Cl.

CPC ............. *C03C 8/16* (2013.01); *B41M 7/0045* (2013.01); *C09D 11/101* (2013.01); *C09D 11/102* (2013.01); *C03C 2214/12* (2013.01)

(58) Field of Classification Search

None
See application file for complete search history.

(56) References Cited

U.S. PATENT DOCUMENTS 4,649,062 A * 3/1987 Kosiorek .............. C08F 290/06 526/310
4,900,763 A 2/1990 Kraushaar ....................... 522/14
5,708,051 A * 1/1998 Erdrich .................. A61K 6/887 524/791
2009/0162592 A1 6/2009 Baikerikar et al. ........... 428/427
2016/0229739 A1* 8/2016 Clabau ...................... C03C 8/02

FOREIGN PATENT DOCUMENTS

| | | | |
|---|---|---|---|
| CA | 2807541 | 2/2012 | .............. C08L 33/04 |
| CN | 104073165 | 10/2014 | ........... C09D 201/00 |
| DE | 19752224 | 5/1998 | ............ C08F 220/18 |
| DE | 19752224 A1 * | 5/1998 | .......... C08F 290/046 |
| WO | 2017009184 | 1/2017 | ................ C09F 4/06 |

OTHER PUBLICATIONS

Search Report issued in Great Britain Patent Appln. Serial No. GB2114865.5, dated Apr. 4, 2022, 4 pages.
International Search Report and Written Opinion issued in PCT/NL2022/050568, dated Dec. 21, 2022, 8 pages.
International Preliminary Report on Patentability issued in PCT/NL2022/050568, dated Apr. 23, 2024, 5 pages.

* cited by examiner

*Primary Examiner* — Mohammad M Ameen
(74) *Attorney, Agent, or Firm* — HAYES SOLOWAY P.C.

(57) ABSTRACT

An enamel composition having a glass frit; a pigment; and an organic carrier medium, wherein the organic carrier medium has a UV-curable composition, and wherein the UV-curable composition comprises at least one mono-functional acrylate monomer. The at least one mono-functional acrylate monomer comprises a compound according to Formula (I) or Formula (II):

Formula (I)

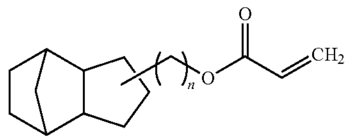

Formula (II)

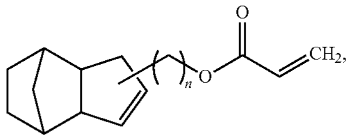

where n is 0 or 1.

23 Claims, 2 Drawing Sheets

ULTRAVIOLET CURABLE ENAMEL COMPOSITIONS

CROSS REFERENCE TO RELATED APPLICATIONS

This application is a US National Phase of PCT International Patent Application Serial No. PCT/NL2022/050568, filed Oct. 7, 2022, which claims priority to Great Britain Patent Application Serial No. 2114865.5, filed Oct. 18, 2021, the contents of which are incorporated herein by reference.

FIELD

The present specification relates to UV-curable enamel ink compositions for screen printing applications on glass.

BACKGROUND

In the automotive glazing industry, it is common to decorate windshields, back and side lights, and other glass components with a black band of obscuration enamel extending around a peripheral region of the components. A primary function is to shield the glue that holds the glass components in place from ultraviolet radiation which would otherwise decompose the glue. A secondary function is to cover up electrical circuits, wires, and connectors that ensure functionality of electrical or electronic components attached to, or embedded into, the glass component and ensure a clean aesthetic appearance.

Enamels are applied as a paste or ink in a screen printing or ink jet process to a flat glass substrate and are subsequently fired at high temperatures, during which the organic carrier medium of the paste or ink burns off and the enamel fuses together and establishes a bond to the substrate. The firing process softens the substrate which can be formed into the final shape by a bending process.

It is known in the art to provide a curable vehicle for an enamel composition. For example, U.S. Pat. No. 4,649,062A (Kosiorek et al) and U.S. Pat. No. 4,900,763A (Kraushaar) disclose ultraviolet radiation curable organic vehicles which are incorporated into compositions to provide thick film ceramic colours. In U.S. Pat. No. 4,649,062, the curable vehicle includes: (a) at least one polymerizable liquid oligomer containing a backbone including at least two acrylate or methacrylate functional end groups; (b) at least one photopolymerizable liquid monomer containing acrylate or methacrylate functional groups, the functionality of said monomer component (b) being in the range of from 1 to 6; and (c) a photoinitiator. In U.S. Pat. No. 4,900,763, the vehicle includes: (a) at least two polymerizable liquid oligomers containing acrylate or methacrylate functional end groups and selected from difunctional-or trifunctional-polyester acrylates or methacrylates and difunctional or trifunctional polyurethane acrylates or methacrylates; (b) at least one monofunctional polyether acrylate or methacrylate; (c) at least one penta-functional aliphatic penta-acrylate or penta-methacrylate; and (d) a photoinitiator.

In another example, WO2017009184A1 (Jain et al) discloses a curable composition comprising: (a) at least one (meth) acrylate monomer or oligomer; and (b) at least one mono-functional (meth) acrylate monomer comprising a polycyclic moiety having at least three rings that are fused or condensed. However, this document does not relate to the field of enamel compositions or to screen printing on a glass substrate.

CA2807541A1 (Brown et al) discloses a heat-curable acrylate-based printing medium. In one example, this document discloses a method of forming a decorated glass structure comprising applying to a first glass substrate an enamel paste composition which includes (i) a glass component and (ii) a low VOC, heat-curable medium. The heat curable medium comprises a functional acrylate monomer having at least one functionality. However, the medium is not UV-curable.

A problem with certain compositions of the prior art is their tendency to shown high: increase in ink viscosity upon application under certain application conditions, which is undesirable. Such conditions include screen printing conditions, whereby an ink is applied to the back of a printing screen, and a blade is then used to push the ink through holes or openings (defining the printing pattern) in the screen. A squeegee or rubber blade is used to cause the screen to contact the substrate thereby causing the ink to be transferred onto the substrate. This process involves several steps that may affect the rheology of the ink, including for example the application of a thin layer of ink using a blade and the removal of excess ink using a vacuum or suction device.

Another problem with the prior art is that certain ink compositions may not exhibit a satisfactory level of hardness or structural integrity after being applied, e.g. screen printed. This may be problematic when the enamel ink is subjected to further processing before the firing process, e.g. when it is overprinted with a conductive metallic (e.g. silver) layer that may, for example, form bus bars and/or wiring connections of a backlight defrosting system. For example, a cured enamel ink layer may typically be over printed with a silver paste that forms a conductive metallic ink in the subsequent firing process. The silver paste is typically a solvent-based ink formulation and thus certain components of the paste, especially solvents, may penetrate the UV cured enamel layer after overprint and before drying of the silver overprint. Thus, an insufficient degree of hardness, structural integrity and/or chemical resistance of the enamel ink layer may cause damage to the enamel ink layer and/or may cause substances, e.g. solvents, of the overprinted layer to penetrate the enamel layer and cause chemical disruption to the ink layer, both of which may result in a decrease in the quality of the enamel layer, for example by negatively affecting its adhesion on a substrate, e.g. glass.

It is an object of the present invention to address or mitigate one or more problems of the prior art.

It is an object of the present invention to provide UV curable enamel ink compositions which exhibit a minimal or reduced change in viscosity in screen printing applications.

SUMMARY

The present inventors have found that, during screen printing, certain enamel ink compositions are susceptible to exhibiting an increase in viscosity. The present inventors have found a solution which advantageously provides a UV-curable composition as a vehicle for enamel inks and which exhibits a minimal or reduced change in viscosity in screen printing applications.

According to one aspect of the present specification, there is provided an enamel composition comprising:

glass frit;

a pigment; and an organic carrier medium, wherein the organic carrier medium comprises a UV-curable composition, wherein the UV-curable composition comprises at least one mono-functional acrylate monomer, and wherein the at least one mono-functional acrylate monomer comprises a compound according to Formula (I) or Formula (II):

Formula (I)

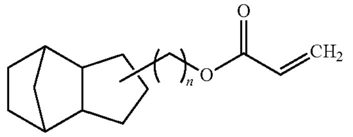

Formula (II)

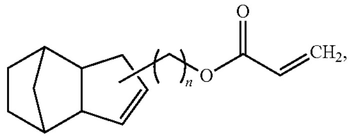

where n is 0 or 1.

The at least one mono-functional acrylate monomer may comprise a compound according to Formula (Ia):

Formula (Ia)

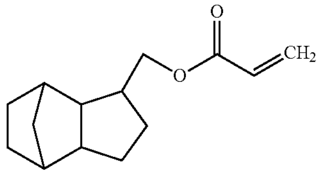

The compound of Formula (Ia) may commonly be named tricyclodecane methanol mono-acrylate.

The at least one mono-functional acrylate monomer may comprise a compound according to Formula (IIa):

Formula (IIa)

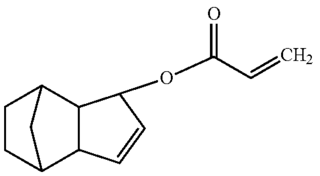

The compound of Formula (IIa) may commonly be named hexahydro-4, 7-methano-1H-indenyl acrylate.

Advantageously, the enamel composition may exhibit a minimal change in viscosity, e.g. after about 30 mins, e.g. after about 1 hour, e.g. after about 2 hours. Advantageously, the enamel composition may exhibit a minimal change in viscosity before, during or after being applied, typically by screen printing. The change in the viscosity of the enamel composition may be less than 50%, e.g. less than 25%, e.g. less than 10%, e.g. less than 5%, typically less than 2%. It will be understood that the change of viscosity observed may depend on other parameters, such as the thickness of the enamel composition layer being applied by screen printing. However, the inventors have found that, advantageously, using one of the claimed compounds (such as tricyclodecane methanol mono-acrylate) as a mono-functional acrylate monomer in the UV-curable composition may help reduce the change of viscosity during a screen printing process compared to other compositions, such as compositions using isobornyl acrylate. Without wishing to be bound by theory, it is believed that the provision of a compound of Formula I or II (such as tricyclodecane methanol mono-acrylate) as a mono-functional acrylate monomer in the UV-curable composition, may stabilise the viscosity of the UV-curable composition by exhibiting a low evaporation rate. For example, tricyclodecane methanol mono-acrylate may exhibit a lower evaporation rate than, for example, isobornyl acrylate. Additionally, it is thought that provision of the claimed compounds (e.g. tricyclodecane methanol mono-acrylate) as a mono-functional acrylate monomer in the UV-curable composition, may provide the resulting coating with superior hardness, structural integrity, and/or chemical resistance.

Thus, according to another aspect of the present specification, there is provided an enamel composition comprising:

glass frit;

a pigment; and an organic carrier medium, wherein the organic carrier medium comprises a UV-curable composition, wherein a change in the viscosity of the enamel composition after being applied by screen printing is less than 50%, e.g. less than 25%, e.g. less than 10%, e.g. less than 5%, typically less than 2%.

The change in viscosity of the enamel composition may be measured after about 30 mins, e.g. about 1 hour, e.g. about 2 hours, e.g. after being applied by screen printing.

Preferably, the UV-curable composition may comprise at least one mono-functional acrylate monomer, wherein the mono-functional acrylate monomer may comprise a compound according to Formula (I), (Ia), (II), or (IIa).

According to another aspect of the present specification, there is provided a method of forming an enamel coating comprising:

depositing an enamel composition as described herein on a substrate;

curing the enamel composition; and firing the cured enamel composition.

Preferably, the enamel composition is deposited by screen printing. Preferably, the curing step may comprise curing the UV-curable composition of the enamel composition. The method may comprise curing the enamel composition by exposing the composition to a source of radiation, e.g. by irradiating the composition with UV light.

Subsequent to the curing step, the method may comprise coating, e.g. printing, at least a portion of the enamel composition, with an outer coating. Typically, the outer coating may comprise or may be a conductive metallic (e.g. silver) layer that may, for example, form buss bars and/or wiring connections of a backlight defrosting system. Advantageously, the present enamel composition may have a superior hardness and/or chemical resistance making it particularly suitable to undergo such overprinting process.

BRIEF DESCRIPTION OF THE DRAWINGS

For a better understanding of the present invention and to show how the same may be carried into effect, certain embodiments of the present invention will now be described by way of example only with reference to the accompanying drawings, in which.

DETAILED DESCRIPTION

Figure 1:
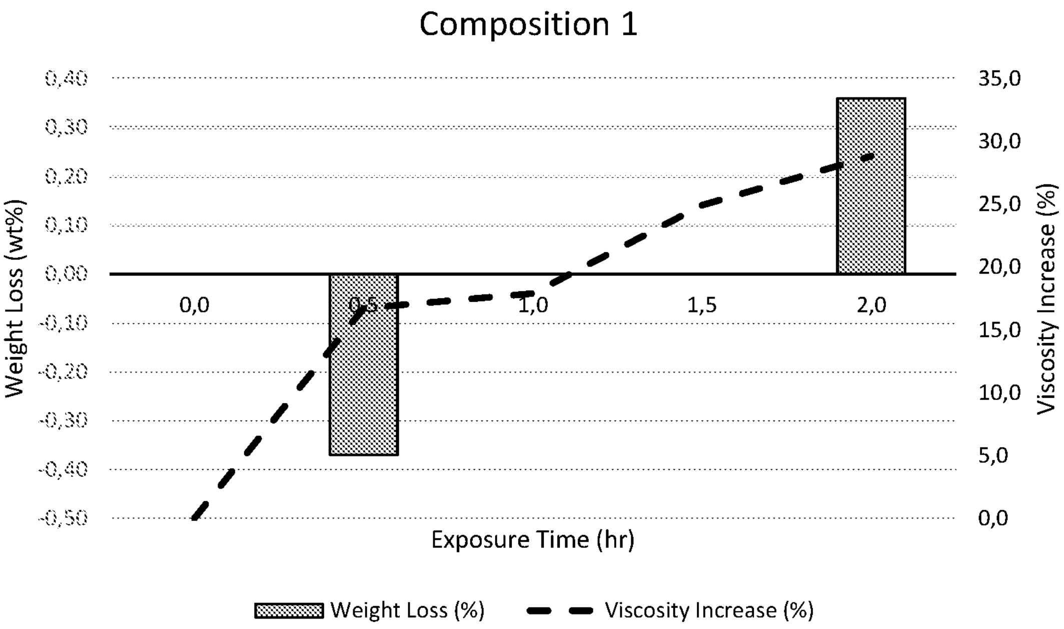
FIGS. 1 shows a graph illustrating the change in viscosity of a composition as described herein.

As described in the summary section, the present specification provides a enamel composition which comprises glass frit, a pigment, and an organic carrier, and which advantageously displays good viscosity stability after being applied by screen printing, and which also exhibit good adhesion on glass and high hardness, structural integrity and/or chemical resistance, compared to existing enamel compositions.

Typically, the organic carrier medium comprises a UV-curable composition which includes a mono-functional acrylate monomer, wherein the mono-functional acrylate monomer comprises a compound according to Formula (I) or Formula (II), such as tricyclodecane methanol mono-acrylate or hexahydro-4,7-methano-1H-indenyl acrylate.

Without wishing to be bound by theory, it is believed that the provision of tricyclodecane methanol mono-acrylate as a mono-functional acrylate monomer in the UV-curable composition, may stabilise the viscosity of the UV-curable composition by exhibiting a low evaporation rate. For example, tricyclodecane methanol mono-acrylate may exhibit a lower evaporation rate than, for example, isobornyl acrylate. Additionally, it is thought that provision of tricyclodecane methanol mono-acrylate as a mono-functional acrylate monomer in the UV-curable composition, may provide the resulting coating with superior hardness, structural integrity, and/or chemical resistance.

The organic carrier medium may consist of the UV-curable composition. The organic carrier medium, e.g. UV-curable composition, may comprise one or more binders. Typically, the binder(s) may comprise or may be a polymer. The binder(s) may comprise an acrylic resin, a cellulosic resin, or the like. The binder(s) may comprise one or more resins selected from the list consisting of cellulose acetate butyrate resin, acrylic resin, or the like. The binder or combination of binders may be selected to provide the composition with a desired viscosity or rheology and/or with a desired level of harness. The organic carrier medium, e.g. UV-curable composition, may comprise the binder(s) in amount of about 0.1-20 wt %, e.g. about 1-10 wt %, e.g. about 2-6 wt %.

The organic carrier medium, e.g. UV-curable composition, may comprise one or more curable polymers. The curable polymer(s) may comprise an unsaturated polymer or oligomer, for example an acrylated polymer or oligomer. The curable polymer(s) may include an aliphatic polyurethane acrylate. The organic carrier medium, e.g. UV-curable composition, may comprise the one or more curable polymers in amount of about 5-60 wt %, e.g. about 10-50 wt %, e.g. about 20-40 wt %.

The organic carrier medium, e.g. UV-curable composition, may comprise one or more acrylic monomers. The one or more acrylic monomers may comprise at least one mono-functional acrylate monomer. The organic carrier medium, e.g. UV-curable composition, may comprise the one or more acrylic monomers in amount of about 20-70 wt %, e.g. about 30-60 wt %, e.g. about 40-50 wt %.

The organic carrier medium, e.g. UV-curable composition, may comprise one or more difunctional acrylic monomers, e.g. tripropylene glycol diacrylate (TPGDA). The organic carrier medium, e.g. UV-curable composition, may comprise the one or more difunctional acrylic monomers in amount of about 5-30 wt %, e. g. about 10-20 wt %.

As mentioned above, preferably, the UV-curable composition may comprise a compound according to Formula (I) or Formula (II), e.g. tricyclodecane methanol mono-acrylate (TCDA) or hexahydro-4,7-methano-1H-indenyl acrylate. The organic carrier medium, e.g. UV-curable composition, may comprise the one or more monofunctional acrylic monomers, e.g. TCDA, in amount of about 10-50 wt %, e.g. about 20-40 wt %.

The organic carrier medium, e.g. UV-curable composition, may further comprise one or more surfactants or dispersants (e.g. Soja Lecithin).

The organic carrier medium, e.g. UV-curable composition, may further comprise one or more photo-initiators and/or photosensitisers.

The organic carrier medium, e.g. UV-curable composition, may further comprise one or more additives selected from the list consisting of UV stabilizers (e.g. 4-Tert-Butylcatechol), adhesion promoters, thickeners, anti-foaming agents, or the like.

The enamel composition, e.g. organic carrier medium thereof, may further comprise one or more diluents, e.g. a solvent. Alternatively, the enamel composition, e.g. organic carrier medium thereof, may not comprise a diluent, e.g. solvent. A solvent may not be required, for example when one of the components of the composition, e.g. one or more acrylic monomers, acts as a reactive diluent for the composition.

The viscosity of the enamel composition, e.g. before curing, may be in the range of about 5-25 Pa·s, e.g. about 10-20 Pa·s, e.g. about 15-18 Pa·s, e.g about 16-17 Pa·s. Typically, viscosity may be measured in a continuous shear rate measurement program (0.10-50 $s^{-1}$) using cone plate geometry (CP 40 mm 1°) at 21° C., recording the viscosity as paste viscosity at shear rate 10 $s^{-1.}$ An enamel composition according to the present invention can be deposited, preferably using a screen printing on a substrate. The composition is then cured, for example by irradiating the composition with UV light.

If required, a portion of the enamel composition may be coated, e.g. printed, with an outer coating, such as a conductive metallic (e.g. silver) layer that may, for example, form bus bars and/or wiring connections of a backlight defrosting system. Advantageously, the present enamel composition may have a superior hardness and/or chemical resistance making it particularly suitable to undergo such overprinting process.

A number of more detailed examples are set out below to illustrate different embodiments of the present invention.

EXAMPLES

Example 1—Preparation of a Composition According to a First Embodiment

Formulation

An embodiment of a formulation for the enamel ink composition is given in Table 1:

TABLE 1

| # | Component | Description | Wt % |
|---|---|---|---|
| 1 | SR306 | Tripropylene glycol diacrylate (TPGDA), Sartomer | 2.812 |
| 2 | SR789 | Tricyclodecane methanol Acrylate (TCDA), Sartomer | 6.152 |
| 3 | Genomerr 1122 | Mono functional urethane acrylate, Rahn | 5.100 |
| 4 | Disperbyk 145 | Dispersant BYK-Altana | 0.800 |
| 5 | Soja Lecithin | Wetting/Dispersing agent | 0.100 |
| 6 | Miramer SC 1400 | Adhesion promotor, Miwon | 0.500 |
| 7 | Omnirad 379 | Photo-initiator, IGM Resins | 0.848 |
| 8 | Speedcure 2-ITX | Sensitizer, Lambson | 0.848 |
| 9 | Speedcure EDB | Co-initiator, Lambson | 0.424 |
| 10 | 4-Tert-Butylcatechol | UV stabilizer | 0.021 |

TABLE 1-continued

| # | Component | Description | Wt % |
|---|---|---|---|
| 11 | Florstab UV | UV stabilizer | 0.105 |
| 12 | Genomer 4269/M22 | Aliphatic urethane acrylate in Genomer 1122, Rahn | 1.050 |
| 13 | CAB 551-0.2 | Cellulose acetate butyrate resin, Eastman | 0.500 |
| 14 | Neocryl B-731 | Acrylic resin, DSM | 0.400 |
| 15 | 1T1768 | Pb-free automotive black enamel for toughening application, JM AGT | 80.00 |
| 16 | Thixatrol Max | Organic Thickener | 0.250 |

Preparation of Composition

Table 2 shows a formulation recipe to prepare the composition of Table 1:

TABLE 2

| # | Component | Description | Wt % |
|---|---|---|---|
| 1 | A | 40 wt % wetting/dispersant solution SR306 | 2.00 |
| 2 | SR306 | Tripropylene glycol diacrylate (TPGDA), Sartomer | 1.70 |
| 3 | B | Photo-initiator/Urethane oligomer diacrylate solution in SR789 | 9.45 |
| 4 | C | Cellulose acetate butyrate solution in Genomer 1122 | 3.33 |
| 5 | D | Acrylic resin solution in Genomer 1122 | 2.67 |
| 6 | Soja Lecithin | Wetting/Dispersing agent | 0.10 |
| 7 | Miramer SC 1400 | Adhesion promotor, Miwon | 0.50 |
| 8 | 1T1768 | Pb-free automotive black enamel for toughening application, JM AGT | 80.00 |
| 9 | Thixatrol Max | Organic Thickener | 0.25 |

This recipe is based on the preparation of 100 g of an enamel ink composition. The composition is prepared using the intermediate components labelled as #1-7. Some of these components, namely #1, 3, 4, and 5, are provided as intermediate components identified respectively as A, B, C and D. The formulation of each of intermediate components A, B, C and D is provided below in Table 2a, 2b, 2c and 2d.

TABLE 2a

| Composition Intermediate A: | | |
|---|---|---|
| Component | Description | Wt % |
| Disperbyk 145 | Dispersant BYK-Altana | 40.00 |
| SR306 | Tripropylene glycol diacrylate, Sartomer | 60.00 |

TABLE 2b

| Composition Intermediate B: | | | |
|---|---|---|---|
| # | Component | Description | Wt % |
| 1 | 4-Tert-Butylcatechol | UV stabilizer | 0.22 |
| 2 | Omnirad 379 | Photo-initiator, IGM Resins | 8.98 |
| 3 | Speedcure 2-ITX | Sensitizer, Lambson | 8.98 |
| 4 | Speedcure EDB | Co-initiator, Lambson | 4.49 |
| 5 | SR789 | Tricyclodecane methanol Acrylate (TCDA), Sartomer | 65.11 |
| 6 | Genomer 4269/M22 | Aliphatic urethane acrylate in Genomer 1122, Rahn | 11.11 |
| 7 | Florstab UV | UV stabilizer | 1.11 |

TABLE 2c

| Composition Intermediate C: | | |
|---|---|---|
| Component | Description | Wt % |
| CAB 551-0.2 | Cellulose acetate butyrate resin, Eastman | 15.00 |
| Genomerr 1122 | Mono functional urethane acrylate, Rahn | 85.00 |

TABLE 2d

| Composition Intermediate D: | | |
|---|---|---|
| Component | Description | Wt % |
| Neocryl B-731 | Acrylic resin, DSM | 15.00 |
| Genomer 1122 | Mono functional urethane acrylate, Rahn | 85.00 |

Components #1-7 were weighed into a plastic container and speed-mixed to yield a homogeneous solution. . . . An enamel powder (component #8) and Thixatrol Max (Component #9) were added, and the mixture was speed-mixed for 20 seconds at 3000 rpm. The paste mixture was homogenized by triple roll milling twice. The paste was diluted with a medium based on mixture #1-7 to a viscosity of around 15 Pa·s.

Analysis of Viscosity

The change in viscosity of an enamel paste over time was assessed using the following test method.

The visco-stability of paste was assessed by applying a thin paste film (200 μm) on glass plate and measuring viscosity and weight loss of thin film after exposure to 30° C. and 65% RH in a climate chamber at interval times of 0.5, 1.0, 1.5 and 2.0 hrs.

Measurement of viscosity was made in a continuous shear rate measurement program (0.10-50 $s^{-1}$) using cone plate geometry (CP 40 mm) 1° at 21° C., recording the viscosity as paste viscosity at shear rate $10s^{-1}$.

Details of the formulations of three different compositions are shown is Table 3 below. Composition 1 corresponds to the composition of Table 1. Compositions 2 to 4 are similar UV-curable compositions but based on different acrylate monomers.

TABLE 3

| | | | Composition | | | |
|---|---|---|---|---|---|---|
| | | | #4 | #3 | #2 | #1 |
| # | Component | Description | wt % | | | |
| 1 | SR306 | Tripropylene glycol diacrylate (TPGDA), Sartomer | 3.9174 | 3.5270 | 7.1517 | 2.9018 |
| 2 | SR789 | Tricyclodecanem ethanol | | | | 6.1518 |

TABLE 3-continued

| # | Component | Description | Composition #4 | #3 | #2 | #1 |
|---|---|---|---|---|---|---|
| | | | wt % | | | |
| | | Acrylate (TCDA), Sartomer | | | | |
| 3 | Genomer 1121 | Isobornyl acrylate (IBOA) | 7.6996 | 7.6996 | | |
| 4 | Genomer 1122 | Mono functional urethane acrylate, Rahn | 2.8333 | 2.8331 | 7.4750 | 5.1000 |
| 5 | Disperbyk 145 | Dispersant, BYK-Altana | 0.8000 | 0.8000 | 0.8000 | 0.8000 |
| 6 | Soja Lecithin | Wetting/Dispersing agent | 0.1000 | 0.1000 | 0.1000 | 0.1000 |
| 7 | Miramer SC 1400 | Adhesion promotor, Miwon | 0.2870 | 0.2870 | 0.2870 | 0.5000 |
| 8 | Omnirad 907 | Photo-initiator, IGM Resins | 0.7813 | | | |
| 9 | Omnirad 379 | Photo-initiator, IGM Resins | | 0.7813 | 0.7813 | 0.8482 |
| 10 | Speedcure 2-ITX | Sensitizer, Lambson | 0.7813 | 0.7813 | 0.7813 | 0.8482 |
| 11 | Speedcure EDB | Co-initiator, Lambson | | 0.3907 | 0.3907 | 0.4241 |
| 12 | 4-Tert-Butylcatechol | UV stabilizer | 0.0193 | 0.0193 | 0.0193 | 0.0210 |
| 13 | Florstab UV | UV stabilizer | 0.0967 | 0.0967 | 0.0967 | 0.1050 |
| 14 | Genomer 4269/M22 | Aliphatic urethane acrylate in Genomer 1122, Rahn | 1.9340 | 1.9340 | 0.9670 | 1.0498 |
| 15 | CAB 551-0.2 | Cellulose acetate butyrate resin, Eastman | 0.5000 | 0.5000 | 0.5000 | 0.5000 |
| 16 | Neocryl B-731 | BMA polymer, DSM | | | 0.4000 | 0.4000 |
| 17 | 1T1768 | Pb-free automotive black enamel for toughening application, JM AGT | 80.0000 | 80.0000 | 80.0000 | 80.0000 |
| 18 | Thixatrol Max | Organic Thickener | 0.2500 | 0.2500 | 0.2500 | 0.2500 |
| | | Total: | 100.0000 | 100.0000 | 100.0000 | 100.0000 |

In Composition 1, the organic carrier medium includes three acrylic monomeric components, namely a difunctional acrylic monomer in the form of tripropylene glycol diacrylate (TPGDA) and two monofunctional acrylic monomers in the form of tricyclodecane methanol mono-acrylate (TCDA) and a monofunctional urethane acrylate.

In contrast, Composition 2 contains TPGDA and a monofunctional urethane acrylate as the acrylic monomeric components. That is, composition 2 does not include tricyclodecane methanol mono-acrylate (TCDA).

In Composition 3, the organic carrier medium includes a mixture of TPGDA, isobornyl acrylate (IBOA) and a monofunctional urethane acrylate. That is, it is similar to Composition 1 but uses IBOA instead of TCDA.

Composition 4 is similar to Composition 3 (both using isobornyl acrylate as a monofunctional acrylic monomer), and only differs in the photo-initiator used, which does not affect qualitatively either viscosity behaviour or hardness.

Figure 2:
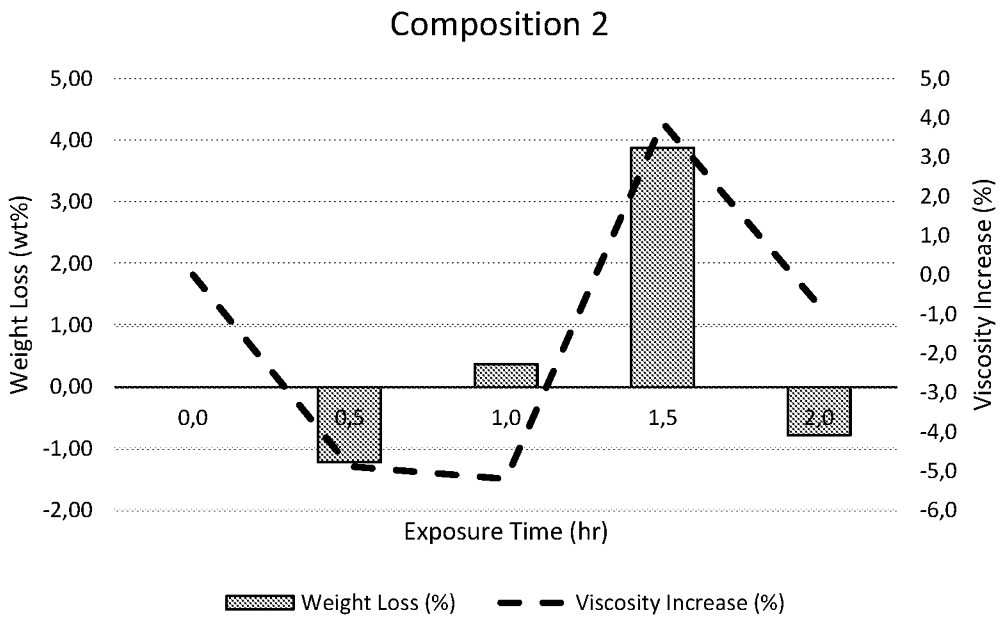
FIGS. 2 and 3 show graphs illustrating the change in viscosity of alternative compositions.
Figure 3:
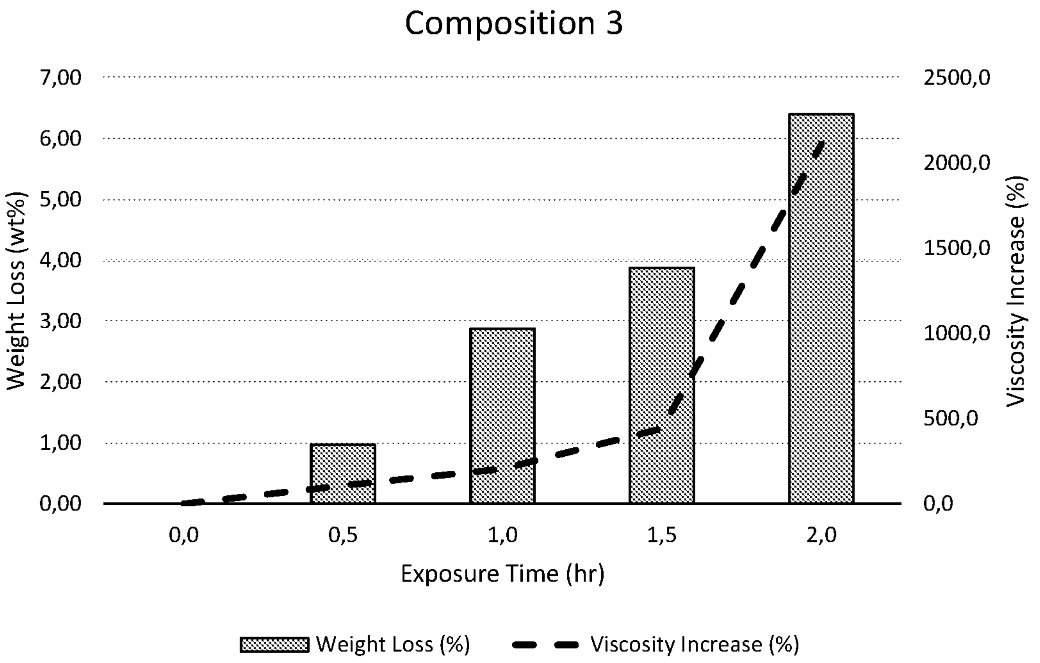

The viscosities measured over time for the Compositions 1, 2 and 3 of Table 3 are shown in FIGS. 1 to 3.

As can be seen from FIG. 1, the viscosity of the UV-curable Composition 1, which uses tricyclodecane methanol mono-acrylate (TCDA) as monofunctional acrylic monomer, remained substantially stable over 2 hours.

Referring to FIG. 2, the viscosity of the UV-curable Composition 2, was also relatively constant over time. However, as composition 2 contains TPGDA and a monofunctional urethane acrylate as the acrylic monomeric components, the solvent resistance of the resulting coating was found to be of lesser quality (see Table 5 later), and was therefore not optimum for subsequent overprinting with, for example, a metallic bus bar.

In contrast, the viscosity of the UV-curable Composition 3, which uses only tripropylene glycol diacrylate (TPGDA) as the acrylic monomer component, exhibited a significant increase in viscosity over the same period of time. Without wishing to be bound by theory, this is believed to be due at least in part to the relatively high evaporation rate of isobornyl acrylate in comparison with tricyclodecane methanol mono-acrylate.

Figure 4:
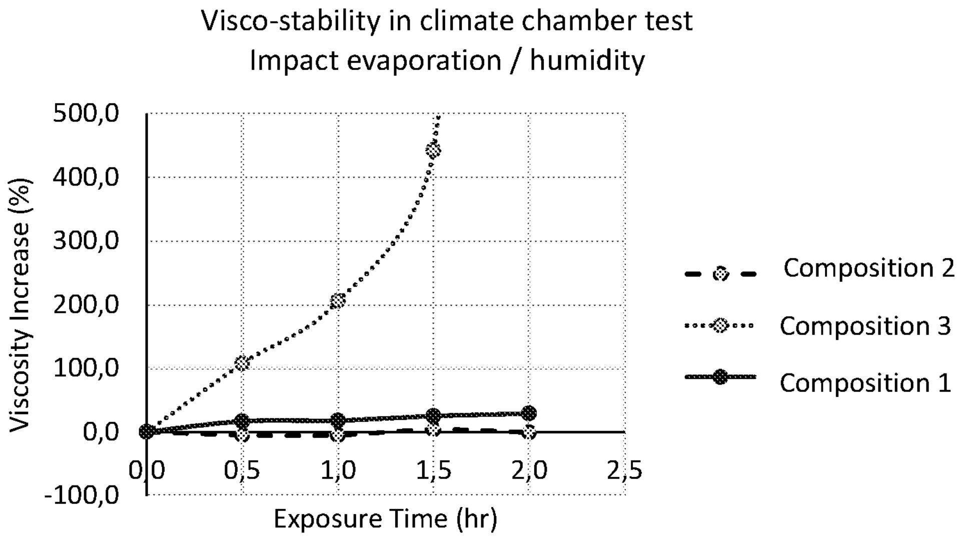
FIG. 4 shows a graph plotting the viscosity increase for the composition of FIGS. 1 to 3.

FIG. 4 shows a graph plotting the viscosity increase for each of Compositions 1, 2 and 3, further illustrating the above observations in respect of FIGS. 1, 2 and 3.

A comparison of the viscosity change over time between compositions 1 and 4, is shown in Table 4.

TABLE 4

| | Sample Code | Composition 4 | Composition 1 |
|---|---|---|---|
| Start viscosity (@ 10 $s^{-1}$) | (Pa · s) | 16.7 | 16.4 |
| 30° C./60% RH | After 1.0 hr | 33.3 | 16.5 |
| | After 2.0 hr | 33.3 | 16.6 |
| Δ (%) after 2.0 hrs | | 99 | 1 |

As can be observed from Table 4, the viscosity of the UV-curable Composition 1, which uses tricyclodecane methanol mono-acrylate (TCDA) as monofunctional acrylic monomer, remained substantially stable over 2 hours. In contrast, the viscosity of the UV-curable Composition 4, which uses only tripropylene glycol diacrylate (TPGDA) as the acrylic monomer component, exhibited a significant increase in viscosity over the same period of time.

This is consistent with the observations made in relation to Composition 3, as Composition 4 is similar to Composition 3(both using isobornyl acrylate as the monofunctional acrylic monomer), and only differs in the photo-initiator used, which was not expected to affect either viscosity behaviour or hardness.

Assessment of Solvent Resistance

Compositions #1 (including TCDA as a monofunctional monomer) and #2 (no TCDA) as described above, were used to prepare a film which was cured and then exposed to solvent attack using butyl diglycol acrylate (BDGA). A qualitative assessment of solvent resistance was performed, and is shown in Table 5.

TABLE 5

| Composition # | #1 | #2 |
|---|---|---|
| UV medium composition (wt %) | | |
| RM.7136 (SR789, TCDA) | 30.8 | — |
| RM.476 (Genomer 1121, IBOA) | — | — |
| RM.407 (SR306, TPGDA) | 14.5 | 35.8 |
| RM.558 (Genomer 1122, UA) | 25.5 | 37.4 |
| Paste stability (30° C./60% RH) | | |
| Start viscosity (@ 10 $s^{-1}$) (Pa · s) | 15.4 | 14.7 |
| Viscosity after 2 hrs (Pa · s) | 14.7 | 14.1 |
| Δ (%) after 2 hrs | −4.5 | −4.1 |
| Smell | Typical TCDA odour (fruity) | Neutral |
| Cured film properties - Solvent attack resistance | | |
| Curing setting (6 m/min, 220 mJ/cm2) Preheating to 35° C. Exposure (4 hrs) to RM.867 (BDGA) + Firing | No attack | Light attack |
| Curing setting (8 m/min, 150 mJ/cm2) Preheating to 35° C. Exposure (4 hrs) to RM.867 (BDGA) + Firing | Light attack | Moderate-attack |

As shown in Table 5, it can be seen that UV-curable Composition 1, which uses tricyclodecane methanol mono-acrylate (TCDA) as monofunctional acrylic monomer, exhibited improved solvent resistance to BDGA, compared to Composition 2 which was free of TCDA.

Application of Enamel Layer

To mimic the visco-stability of paste in the screen printing process, a thin film (wet film thickness: 50 micron) of paste was cast on a glass substrate and was exposed to 30° C. and 60% RH in a climate chamber with controlled air circulation. According to the results shown in Table 4, the viscosity change of the paste made according to Composition 1 was almost negligible, whereas the isobornyl acrylate-based UV paste (Composition 4) showed a significantly higher increase in viscosity.

The UV-curable paste (Composition 1) was screen printed on a glass sheet using screen mesh size (77T, 90T). It will be understood that in practice the glass substrate may be any glass suitable for use in the automotive industry, such as clear, green or dark coloured (i.e. privacy glass) float glass. The screen-printed film (wet film thickness about 20-22 micron) was exposed to UV curing using an industrial UV curer.

The cured film was over printed with silver paste (AG330L-80) in the form of a bus bar (wet film thickness: 25-30 micron) and was dried in an industrial IR belt drier. The cured black enamel with silver overprint was in a roller kiln according to a firing cycle suitable for toughening enamel for backlight.

While this invention has been described with reference to certain examples and embodiments, it will be understood to those skilled in the art that various changes in form and detail may be made without departing from the scope of the invention as defined by the appended claims.

The invention claimed is:

1. An enamel composition comprising:

glass frit;

a pigment; and an organic carrier medium, wherein the organic carrier medium comprises a UV-curable composition, wherein the UV-curable composition comprises at least one mono-functional acrylate monomer, and wherein the at least one mono-functional acrylate monomer comprises a compound according to Formula (I) or Formula (II):

Formula (I)

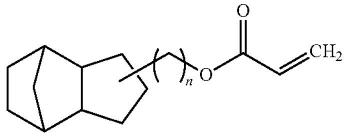

Formula (II)

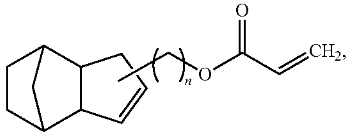

where n is 0 or 1.

2. The composition according to claim 1, wherein the at least one mono-functional acrylate monomer comprises tricyclodecane methanol mono-acrylate or hexahydro-4,7-methano-1H-indenyl acrylate.

3. The composition according to claim 1, wherein the enamel composition exhibits a change in viscosity after 2 hours which is less than 25%.

4. The composition according to claim 3, wherein the change in viscosity is less than 2%.

5. The enamel composition according to claim 1, wherein a change in the viscosity of the enamel composition after being applied by screen printing is less than about 25%.

6. The composition according to claim 5, wherein the change in viscosity after 2 hours is less than 2%.

7. The composition according to claim 5, wherein the at least one mono-functional acrylate monomer comprises tricyclodecane methanol mono-acrylate or hexahydro-4,7-methano-1H-indenyl acrylate.

8. The composition according to claim 1, wherein the UV-curable composition comprises one or more polymeric binders.

9. The composition according to claim 1, wherein the UV-curable composition comprises one or more curable polymers.

10. The composition according to claim 9, wherein the curable polymer(s) comprises an acrylated polymer or oligomer.

11. The composition according to claim 1, wherein the UV-curable composition further comprises one or more difunctional acrylic monomers.

12. The composition according to claim 11, wherein the one or more difunctional acrylic monomers comprises tripropylene glycol diacrylate (TPGDA).

13. The composition according to claim 11, wherein the UV-curable composition comprises the one or more difunctional acrylic monomers in amount of 10 to 20 wt %.

14. The composition according to claim 1, wherein the UV-curable composition comprises the at least one mono-functional acrylic monomer in amount of 20 to 40 wt %.

15. The composition according to claim 1, wherein the UV-curable composition further comprises one or more surfactants or dispersants.

16. The composition according to claim 1, wherein the UV-curable composition further comprises one or more photo-initiators and/or photosensitisers.

17. The composition according to claim 1, wherein the UV-curable composition further comprises one or more additives selected from the list consisting of UV stabilizers, adhesion promoters, thickeners, and anti-foaming agents.

18. The composition according to claim 1, wherein the organic carrier medium further comprises one or more diluents or solvents.

19. The composition according to claim 1, wherein the viscosity of the composition before curing is in the range of 10 to 20 Pa·s.

20. A method of forming an enamel coating comprising:

depositing an enamel composition according to claim 1 on a substrate;

curing the enamel composition; and firing the cured enamel composition.

21. The method according to claim 20, comprising depositing the enamel composition by screen printing.

22. The method according to claim 20, wherein the curing step comprises curing the UV-curable composition of the enamel composition by exposing the composition to a source of UV radiation.

23. The method according to claim 20, comprising, subsequent to the curing step, printing at least a portion of the enamel composition with an outer metallic layer.

* * * * *